United States Patent
Herle

(10) Patent No.: US 10,476,065 B2
(45) Date of Patent: Nov. 12, 2019

(54) LITHIUM METAL COATING ON BATTERY SEPARATORS

(71) Applicant: APPLIED MATERIALS, INC., Santa Clara, CA (US)

(72) Inventor: Subramanya P. Herle, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 15/526,267

(22) PCT Filed: Jan. 8, 2016

(86) PCT No.: PCT/US2016/012720
§ 371 (c)(1),
(2) Date: May 11, 2017

(87) PCT Pub. No.: WO2016/112333
PCT Pub. Date: Jul. 14, 2016

(65) Prior Publication Data
US 2017/0324073 A1    Nov. 9, 2017

Related U.S. Application Data

(60) Provisional application No. 62/101,794, filed on Jan. 9, 2015.

(51) Int. Cl.
*H01M 2/16*    (2006.01)
*H01M 2/14*    (2006.01)
(Continued)

(52) U.S. Cl.
CPC ......... *H01M 2/1686* (2013.01); *H01M 2/145* (2013.01); *H01M 2/1646* (2013.01);
(Continued)

(58) Field of Classification Search
None
See application file for complete search history.

(56) References Cited

U.S. PATENT DOCUMENTS 8,520,367 B2    8/2013    Lee et al.
2004/0106037 A1*    6/2004    Cho ............... H01M 2/145
429/144
(Continued)

FOREIGN PATENT DOCUMENTS

CN    102385991 A    3/2012
JP    2002-231221 A    8/2002
(Continued)

OTHER PUBLICATIONS

JP2002231221 Hashimoto et al. Japan. Aug. 16, 2002 (Year: 2002).*
(Continued)

*Primary Examiner* — Christopher P Domone
(74) *Attorney, Agent, or Firm* — Pillsbury Winthrop Shaw Pittman LLP

(57) ABSTRACT

A lithium ion battery may comprise a positive electrode, a negative electrode and a separator coated with a thin film of lithium metal, the thickness of the lithium being less than or equal to a thickness sufficient to compensate for the irreversible loss of lithium during the first cycle of the battery. Furthermore, there may be a ceramic layer on the separator between the separator and the lithium metal thin film. Yet furthermore, there may be a barrier layer between the ceramic layer and the lithium metal thin film, wherein the barrier layer blocks Li dendrite formation. Furthermore, the separator may have pores which may be filled with one or more of a lithium ion-conducting polymer, a binder soluble in a liquid electrolyte, and a lithium ion-conducting ceramic material. Methods of, and equipment for, fabricating such battery separators and also for fabricating components for lithium metal based batteries are described.

11 Claims, 3 Drawing Sheets

(51) Int. Cl.
*H01M 10/0585* (2010.01)
*H01M 10/0525* (2010.01)
*H01M 10/058* (2010.01)
*H01M 10/42* (2006.01)

(52) U.S. Cl.
CPC ....... *H01M 2/1653* (2013.01); *H01M 10/058* (2013.01); *H01M 10/0525* (2013.01); *H01M 10/0585* (2013.01); *H01M 10/42* (2013.01)

(56) References Cited

U.S. PATENT DOCUMENTS

| | | | |
|---|---|---|---|
| 2012/0202103 A1* | 8/2012 | Yu | H01M 10/4257 429/144 |
| 2013/0199030 A1 | 8/2013 | Song et al. | |
| 2014/0186724 A1* | 7/2014 | Hammond | H01M 2/1646 429/405 |

FOREIGN PATENT DOCUMENTS

| | | | |
|---|---|---|---|
| JP | 2002231221 | * | 8/2002 |
| JP | 2009-0106037 A | | 6/2009 |
| WO | 2015/003123 A1 | | 1/2015 |

OTHER PUBLICATIONS

Taiwan Intellectual Property Office, Search Report for corresponding TW Application No. 105100584, dated May 3, 2019, pp. 1.

* cited by examiner

LITHIUM METAL COATING ON BATTERY SEPARATORS

CROSS REFERENCE TO RELATED APPLICATIONS

This application is a U.S. National Phase patent application of PCT/US2016/012720, filed Jan. 8, 2016, which claims priority to U.S. Provisional Application No. 62/101,794 filed Jan. 9, 2015, both of which are hereby incorporated by reference in the present disclosure in their entirety.

FIELD

Embodiments of the present disclosure relate generally to Li batteries, methods of making the same, and equipment for making the same.

BACKGROUND

Li batteries generally suffer an irreversible lithium loss during the first operating cycle. There is a need for improved Li battery designs which can readily accommodate this Li loss, methods of making these improved batteries, and equipment for making these improved batteries.

SUMMARY

The present disclosure describes lithium metal coated separators for Li ion batteries, methods for making the same, and equipment for making the same.

According to some embodiments, a lithium ion battery may comprise: a positive electrode; a negative electrode; and a separator between the positive electrode and the negative electrode, the separator being coated with a thin film of lithium metal, the thin film of lithium metal having a thickness less than or equal to a thickness sufficient to compensate for the irreversible loss of lithium metal during a first cycle of the lithium ion battery.

According to some embodiments, a method of fabricating a battery separator may comprise, depositing a thin film of lithium metal on a separator film, wherein the thin film of lithium metal is at least 1 micron thick, and wherein the depositing does not fill pores of the separator film.

According to some embodiments, an apparatus for manufacturing lithium metal coated battery separators may comprise: a reel to reel system for transporting a continuous separator film through one or more modules; and a first module for depositing a thin film of lithium metal on the separator film, the first module being configured for depositing the thin film of lithium metal by a process chosen from the group consisting of physical vapor deposition, electron-beam evaporation, thin film transfer and slot die deposition and wherein the first module is further configured for depositing the thin film of lithium metal without filling pores of the separator film.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION

Figure 1:
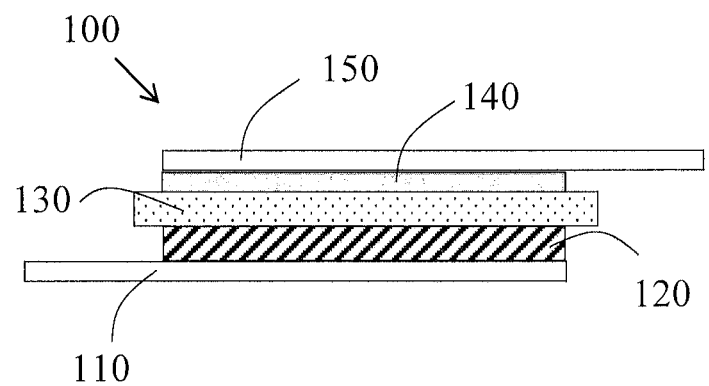
FIG. 1 is a cross-sectional representation of a first example of a lithium ion battery, according to some embodiments.

Embodiments of the present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present disclosure, an embodiment showing a singular component should not be considered limiting; rather, the disclosure is intended to encompass other embodiments including a plurality of the same component, and vice-versa, unless explicitly stated otherwise herein. Moreover, it is not intended for any term in the present disclosure to be ascribed an uncommon or special meaning unless explicitly set forth as such. Further, the present disclosure encompasses present and future known equivalents to the known components referred to herein by way of illustration.

According to some embodiments, a lithium battery may comprise a positive electrode, a negative electrode and a separator coated with a thin film of lithium metal. Furthermore, the thin film of lithium metal may be just sufficient to compensate for the irreversible loss of lithium metal during the first cycle of the battery, which in some embodiments may be a lithium metal film 1 to 5 microns thick. In some embodiments, to reduce the chance of shorting of the battery, the thin film of lithium metal should be less than or equal to the amount of lithium needed to compensate for the irreversible loss, such that all of the thin film of lithium metal will be removed from the separator to the negative electrode during the formation cycles of the lithium battery. Furthermore, there may be a ceramic layer on the separator between the separator and the lithium metal thin film. Yet furthermore, there may be a barrier layer between the ceramic layer and the lithium metal thin film, wherein the barrier layer is formed of a material such as oxides and oxy-nitrides of aluminum and zirconium, nitrides of aluminum/silicon, lithium aluminate, lithium nitrate, lithium borate, lithium lanthanum zirconate, etc. The barrier layer may function to block lithium metal dendrite formation, and/or to help increase the ion conductivity of the separator. Furthermore, the separator may have pores and the pores in the separator may be filled with a lithium ion-conducting polymer, a binder soluble in a liquid electrolyte, or a lithium ion-conducting ceramic material (where the ceramic material is continuous at the interface with the lithium metal thin film).

FIG. 1 illustrates an example Li ion battery structure having a coated separator according to some embodiments, Cell 100 has a positive current collector 110, a positive electrode 120, a coated separator 130, a negative electrode 140 and a negative current collector 150. Note in FIG. 1 that the current collectors are shown to extend beyond the stack, although it is not necessary for the current collectors to extend beyond the stack, the portions extending beyond the stack may be used as tabs. The current collectors 110, 150, on positive and negative electrodes, respectively, can be identical or different electronic conductors. Example materials for current collectors are copper, aluminum, carbon, nickel, metal alloys, etc. Furthermore, current collectors may be of any form factor, shape and micro/macro structure. Generally, in prismatic cells, tabs are formed of the same material as the current collector and may be formed during fabrication of the stack, or added later. All components except current collectors 110 and 150 contain lithium ion electrolytes.

In some embodiments of a lithium ion cell of the present disclosure, lithium is contained in atomic layers of crystal structures of carbon graphite ($LiC_6$) at the negative electrode and lithium manganese oxide ($LiMnO_4$) or lithium cobalt oxide ($LiCoO_2$) at the positive electrode, for example, although in some embodiments the negative electrode may also include lithium absorbing materials such as silicon, tin, etc. The cell, even though shown as a planar structure, may also be formed into a cylinder by rolling the stack of layers; furthermore, other cell configurations may be formed.

Electrolytes infused in cell components 120, 130 and 140 can be comprised of a liquid/gel or a solid polymer and may be different in each.

Figure 2:
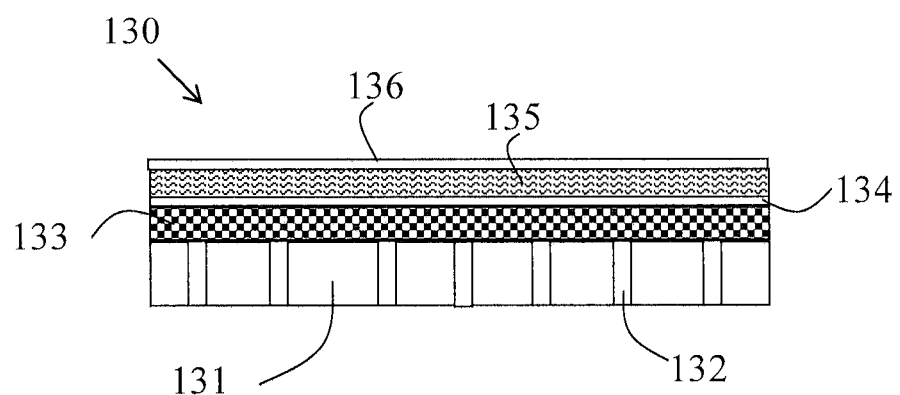
FIG. 2 is a cross-sectional representation of a coated separator for a lithium ion battery, according to some embodiments.

FIG. 2 shows an embodiment of the coated separator 130 in more detail. The coated separator 130 comprises: a separator film 131 with pores 132; a ceramic coating 133 on the separator film; a barrier layer 134 between the ceramic coating and the thin film of lithium metal 135; and a protective coating 136. In embodiments, the separator is typically an approximately 25 micron thick porous structure made of polyolefin. Commercially available separators that are suitable for use with some embodiments of the present disclosure include, for example, polymeric porous separators produced by Polypore (Celgard), Toray Tonen (Battery separator film (BSF)), SK Energy (lithium ion battery separator (LiBS)), Evonik industries (SEPARION), Asahi Kasei (Hipore), DuPont (Energain), etc. The barrier layer may be formed of a material such as lithium aluminate, lithium nitrate, lithium borate, etc. Furthermore, in some embodiments the pores in the separator may be filled with a binder soluble in liquid electrolyte, such as a mixed carbonate electrolyte, etc., or a lithium ion-conducting polymer such as PEO (poly-ethylene oxide), block-co-polymers, etc.; this filling of the pores may be helpful to avoid depositing lithium metal into the pores during certain lithium metal deposition methods. In some embodiments the lithium is deposited on the side of the separator facing the negative (lithium) electrode.

In some embodiments the coated separator may comprise a thin film of lithium metal and one or more of: the ceramic coating; the barrier layer; the protective coating; and pores of the separator filled with one or more materials chosen from the group consisting of a lithium ion-conducting polymer, a binder soluble in a liquid electrolyte, and a lithium ion-conducting ceramic material.

According to some embodiments the separator of FIG. 2 may be fabricated utilizing the following processes and equipment. Different configurations of web tools for fabricating separators according to the present disclosure are shown schematically in FIGS. 3 through 5—it should be noted that these are schematic representations and it is understood that the configurations of the web systems and modules may be varied as needed to control the different steps of the fabrication processes.

A battery separator may be fabricated using methods of the present disclosure as described herein. According to some embodiments, a method of fabricating a battery separator may comprise: depositing a thin film of lithium metal on a separator film; wherein the depositing a thin film of lithium metal may be by PVD, such as evaporation, a transfer process, or a slot die process, and wherein the lithium metal does not fill the pores of the separator film during the depositing. Furthermore, before the depositing a thin film of lithium metal, a ceramic layer may be deposited on a separator film, wherein the thin film of lithium metal is deposited on the ceramic layer. Furthermore, in embodiments, before the depositing a thin film of lithium metal, a lithium ion conducting polymer, a binder soluble in a liquid electrolyte, and/or a lithium ion-conducting ceramic material may be deposited to fill the pores in the separator film. Yet furthermore, in embodiments a barrier layer may be deposited between the ceramic layer and the lithium metal thin film, wherein the barrier layer is formed of a material such as lithium aluminate, nitrate, borate, ion-conducting sulfides, etc. Furthermore, the lithium metal film may be coated with a protective layer, such as lithium carbonate or lithium fluoride, for protecting the lithium metal from ambient oxidants.

A lithium metal coated separator may be fabricated using tools of the present disclosure as described herein. According to some embodiments, a web tool for forming lithium metal coated separators may comprise: a reel to reel system for taking a separator through the following modules: a module for depositing a thin film of lithium metal on the separator; wherein the module for depositing a thin film of lithium metal may include a PVD system, such as an electron-beam evaporator, a thin film transfer system (including large area pattern printing systems such as gravure printing systems) or a slot die deposition system. In some embodiments the tool may further comprise a module for forming a protective coating on the surface of the thin film of lithium metal. In some embodiments the tool may further comprise a module for depositing a ceramic layer on the separator before the depositing of the thin film of lithium metal, wherein the lithium metal is deposited on the surface of the ceramic layer. In some embodiments the tool may further comprise a module for depositing a barrier layer on the ceramic layer before the lithium metal is deposited on the surface of the ceramic layer. In some embodiments the tool may further comprise a module for depositing a lithium ion-conducting polymer, a binder soluble in a liquid electrolyte, or a lithium ion-conducting ceramic material into the pores of the separator. Furthermore, according to some embodiments, a tool for lithium metal thin film transfer to a separator film may comprise a drum coated with a corrosion resistant layer of a material such as $ZrO_2$, YSZ (yttria-stabilized zirconia), LLZO or other solid electrolytes, intermetallic carbides or nitrides of silicon and tungsten, Inconel®, etc.

Figure 3:
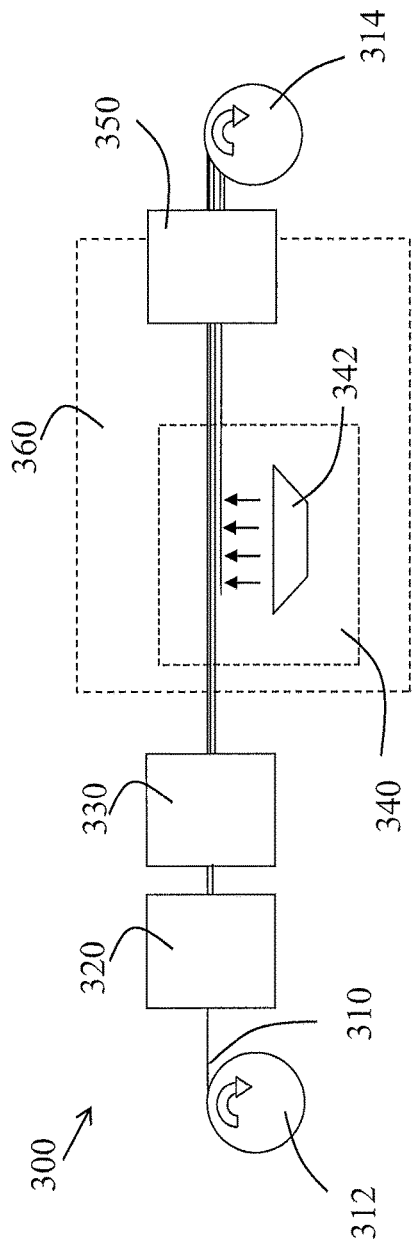
FIG. 3 is a first web tool for forming a lithium metal coated separator, according to some embodiments.

In FIG. 3, the web tool 300 may comprise: reels 312 and 314 for moving a continuous sheet of separator material 310 through the different processing modules; a module 320 for depositing a ceramic layer on one surface of the separator; a module 330 for depositing a barrier layer on top of the ceramic layer; a module 340 for depositing a thin film of lithium metal on the surface of the ceramic layer/barrier layer; and a module 350 for forming a protective coating on the exposed surface of the lithium metal layer. The area 360 indicates a portion of the web tool that may need to be under a controlled environment to avoid oxidation of the lithium metal thin film—for example in some embodiments an environment without oxidizers such as water and oxygen, a nitrogen gas environment is provided; furthermore, if a protective coating is not applied, then the lithium metal coated separator will need to be maintained in a non-oxidizing environment until the separator is integrated into a lithium ion battery cell. In some embodiments the finished separator will not be collected on reel 314 as shown in the figures, but may go directly for integration with the positive and negative electrodes, etc., to form battery cells.

The lithium metal deposition module 340 is shown to comprise a physical vapor deposition (PVD) source 342, which may be a lithium metal electron beam evaporator (cold) in a vacuum environment, for example, Note that the lithium metal film may be deposited in sheets which correspond to the size of the cell separators as used in the battery cells, such that there is no lithium metal on the areas of the separator which will be cut, thus avoiding smearing of the lithium metal and potential shorting of the battery cell when assembled.

Furthermore, in some embodiments the module 330 may provide deposition of an electrolyte soluble binder for filling the pores of the separator in order to avoid accumulation of lithium metal in the pores during deposition, or in embodiments the module 330 may provide deposition of a lithium ion-conducting polymer for filling the pores of the separator.

Figure 4:
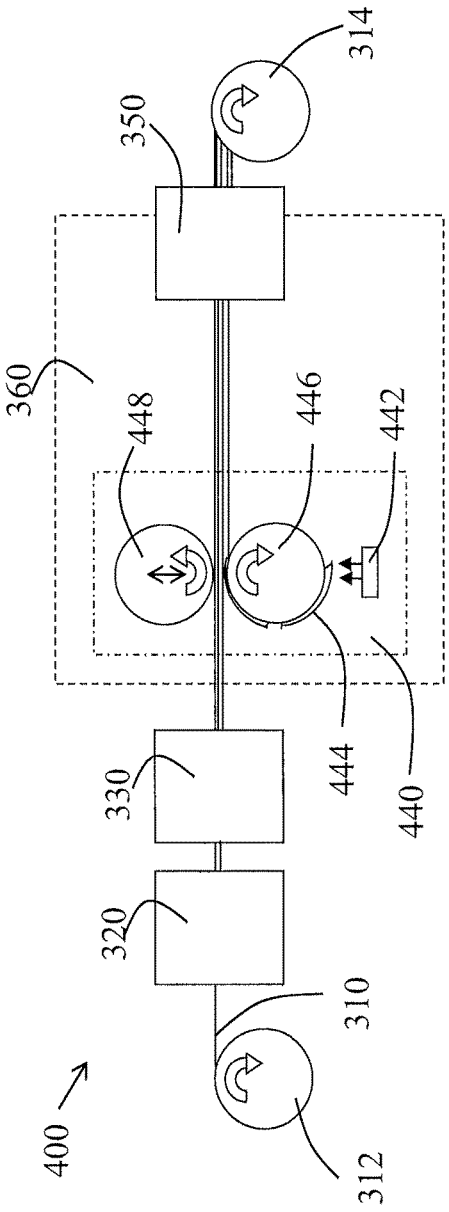
FIG. 4 is a second web tool for forming a lithium metal coated separator, according to some embodiments.

In FIG. 4, the web tool 400 is shown with a lithium metal deposition module 440 comprising a lithium metal source 442, such as a lithium metal ingot electron beam evaporation system (cold), for depositing lithium metal thin films 444 on to a transfer drum 446, and a drum 448 configured with drum 446 to enable transfer of the lithium metal thin film from the transfer drum 446 to the separator 310. Another example of a lithium metal source 442 is a lithium metal sheet or wire the edge or end of which is steadily introduced to the surface of a plate heated to a temperature sufficient to evaporate the lithium metal. Note that drum 448 may be adjusted (as indicated by the vertical double headed arrow in FIG. 4) to change the amount of "pinch" between the drums 446 and 448 if desired to initiate the transfer of the lithium metal thin film from the transfer drum 446 to the separator 310, or otherwise. Note that the lithium metal films 444 may be sized to correspond to the size of the cell separators as used in the battery cells, such that there is no lithium metal on the areas of the separator which will be cut, thus avoiding smearing of the lithium metal and potential shorting of the battery cell when assembled. In some embodiments the transfer drum is coated with a layer of a lithium compatible material such as a garnet (e.g. $Li_xLa_3Zr_2O_{12}$ where $x \leq 7$ (LLZO)) or a combination of a solid electrolyte with other materials (e.g. $ZrO_2$, YSZ, $Li_3BO_3$ glass etc.). Note that this coating of the drum may be needed when the drum is made of metals such as stainless steel which are corroded by lithium metal with prolonged ambient exposure. Such a coating may be applied to the drum using thermal spray coating, a PVD process such as sputter deposition from a target made of the solid electrolyte material (or from a target with a composition adjusted to provide a deposited film of the desired composition), etc.

Figure 5:
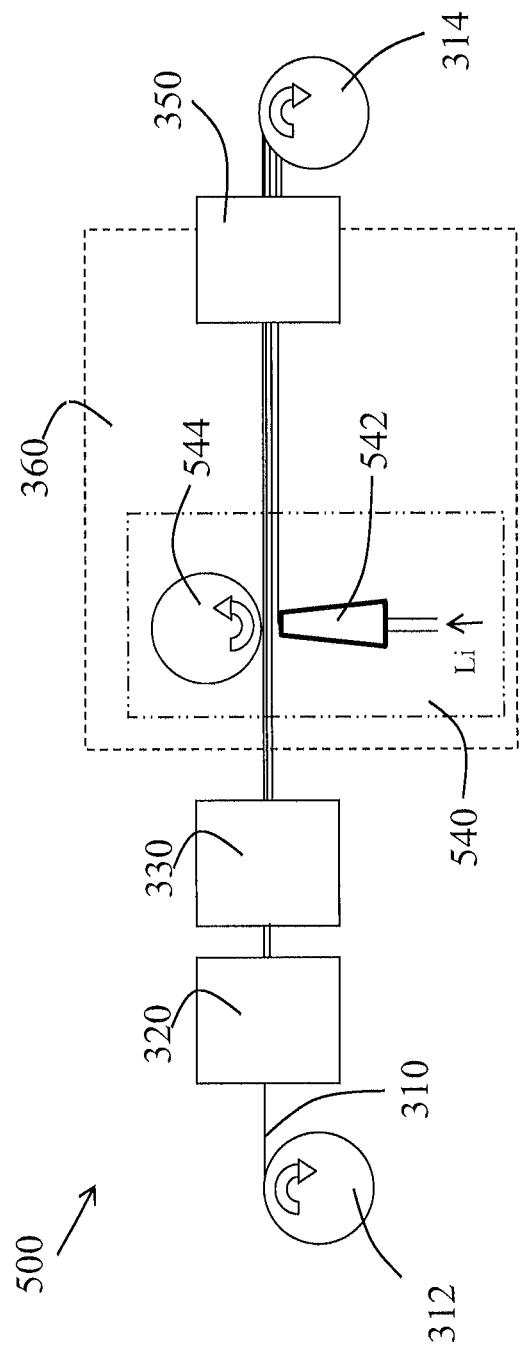
FIG. 5 is a third web tool for forming a lithium metal coated separator, according to some embodiments.

In FIG. 5, the web tool 500 is shown with a lithium metal deposition module 540 comprising a slot die lithium metal source 542, and a drum 544 configured with the head of the slot die lithium metal source to provide deposition of a lithium metal film. In embodiments, instead of the slot die lithium metal source being a liquid lithium delivery system with a large reservoir of liquid metal, 542 can be a Li metal ingot the top layer of which is melted to make a liquid film. Furthermore, the orientation of the Li metal ingot with respect to the coating drum may be varied. Note that the lithium metal film may be deposited in sheets which correspond to the size of the cell separators as used in the battery cells, such that there is no lithium metal on the areas of the separator which will be cut, thus avoiding smearing of the lithium metal and potential shorting of the battery cell when assembled. The ceramic coating of the separator helps with thermal management—to overcome shrinkage issues associated with some separators, such as poly-olefin separators, when exposed to the temperatures of molten lithium, for example. Furthermore, the precise configuration of the web tool and orientation of the slot die lithium source 542 and drum 544 may be varied as needed to control the lithium metal deposition onto the separator.

Furthermore, in some embodiments, the lithium metal deposition system may be a screen printer.

In some embodiments, the ceramic coating may be effective in eliminating battery cell failures due to thermal shrinkage and associated tearing of separators such as the poly-olefin separators. The ceramic coating in module 320, may proceed as follows. In some embodiments, a layer by layer coating of oppositely charged nanometer/micron-sized particles from an aqueous medium may be used to form a ceramic coating on separators such as porous polyolefin separators. In a first step, two suspensions or emulsions of oppositely charged particles are prepared. The ceramic particles may be an insulating oxide such as $Al_2O_3$, $SiO_2$, $AlO_xN_y$, AlN (aluminum deposited in a nitrogen environment), $ZrO_2$, etc., or an ion conducting ceramic such as $(Li,La)TiO_3$, Li—La—Zr—O, sulfide based electrolytes, etc. The particles are in some embodiments are nanometer-sized, but in embodiments can be micrometer-sized. The particles may be dense or hollow. Examples of commercially available ceramic particles that can be used in some embodiments are $Al_2O_3$, $SiO_2$ and MgO. A charge may be imparted to the particles either by controlling the composition or pH of the solution or by attaching a charger polyelectrolyte to the particle, by adsorption or reactive chemical bonding (grafting). Polyelectrolytes are polymers whose repeating units bear an ionizable group. These groups will dissociate in certain solutions (e.g. water), making the polymers charged. Polyelectrolyte properties are thus similar to both electrolytes (salts) and polymers (high molecular weight compounds), and are sometimes called polysalts. Some of the industrially used poly-electrolytes are polydiallyldim-ethylammonium chloride, poly(allylamine)-Nafion/poly (acrylic acid), linear N, N-dodecyl,methyl-poly(ethyl-eneimine)/poly(acrylic acid), poly(ethyleneimine), poly (styrene sulfonate), poly(allylamine hydrochloride), poly (allylamine/poly(acrylic acid), poly(acrylic acid)/polyethylene oxide-block-polycaprolactone. Examples of negatively charged polyelectrolytes, when dissociated are poly(sodium styrene sulfonate) (PSS) and polyacrylic acid (PAA). Both PSS and PAA are negatively charged polyelectrolytes when dissociated. PSS is a 'strong' polyelectrolyte (fully charged in solution), whereas PAA is 'weak' (partially charged). Examples of positively charged polymers are polyethylenimines, polylysene, polyallylamine hydrochloride etc. Adsorption of polyelectrolytes on solid substrates is a surface phenomenon where long-chained polymer molecules with charged groups bind to a surface that is charged in the opposite polarity. Furthermore, it may be necessary to prepare the separator if it is not inherently charged. In some embodiments, this preparation may include exposing the separator to a corona, chemically treating it (e.g. with an oxidizing agent), or adsorbing or grafting a polyelectrolyte to the surface of the separator. Having a charged separator may be desired for a first layer of oppositely charged particles to bind to the separator. A self-limiting layer consisting of one layer of particles may be applied. For example, if the separator is positively charged, then a negatively charged layer is applied. Once the surface is completely covered with the negatively charged layer, deposition of particles is ceased. It should be noted that the term "self-limiting" is used in this context to indicate that since a mono-layer of particles is deposited, there is no build-up of particles due to the natural repulsion between like charged particles. The application can be performed by coating the appropriate mixture onto the separator using a spray coating process, for example. A rinsing process is performed to rinse away any excess particles and solution. The rinsing may be performed by spraying water on the deposited layer or running the separator through a water bath. Alternatively, non-aqueous solvents such as acetonitrile, ethanol, N-Methyl-2-pyrrolidone, tetrahydrofuran etc. can be used. At this point, the separator is coated with one layer of ceramic particles having a thickness substantially corresponding to a diameter of the ceramic particles that have been used in the polymer solution. A second layer of particles of opposite charge to the previous layer is applied, and rinsing is performed. The application and rinsing can be performed in the same manner as described above for the previous layer. At this point, the separator will have a ceramic coating with a thickness substantially about twice the diameter of the ceramic particles being used. These steps are repeated as many times as necessary to achieve the desired thickness of the ceramic coating—for example, a coating of about 3 microns thick can be applied on a surface of the separator that faces a negative electrode in a battery structure. However, both sides of the separator can be coated in some embodiments. In such embodiments, the entire coated separator structure can be about 16 microns thick, and perhaps as thin as 10 microns thick.

Furthermore, in some embodiments the ceramic layer coating process involves dry methodologies for forming the ceramic coating rather than the wet process described above. In one example a dry process involves the use of physical vapor deposition (PVD) techniques and does not utilize particles. For example, the processing starts with preparing the ceramic film source material which source material can include $SiO_2$ or $Al_2O_3$ in a solvent—in some embodiments an aqueous solvent with surfactant molecules to properly disperse the particles. The separator structure is placed in a PVD chamber and the ceramic coating is deposited. The separator structure can include $SiO_2$, $Al_2O_3$, lithium conducting ceramic oxides such as doped variants of the garnet compositions, perovskites, anti-perovskites and lithium conducting sulfides, with a polymeric separator as substrate. Deposition continues until the desired thickness of material is deposited and the coated separator is removed from the PVD chamber. It should be noted that the deposition can be repeated for forming films on both sides of the separator structure.

The deposition processes of module 330 may include: for barrier layer deposition a thermal spray, PVD deposition (such as cold electron beam, sputter, etc.), etc.; and for polymer (binder or lithium ion-conducting material) deposition a thermal spray, slot die, etc.

The protective coating formation process of module 350 may include: for a lithium carbonate coating controlled exposure to carbon dioxide (to provide a specific carbonate thickness); for an inorganic protective coating a thermal spray process, PVD deposition process (such as cold electron beam, sputter, etc.), etc.; and for a polymer coating a thermal spray process, slot die process, etc.

A Li ion battery with a separator according to some embodiments may be combined with positive and negative electrodes to form a battery such as schematically shown in FIG. 1. The integration of the separator with the other battery components may occur in the same manufacturing facility used for fabricating the separator, or the separator may be shipped on a spool and integration may occur elsewhere. The process of fabricating a battery proceeds generally as follows: separator, negative electrode and positive electrode are provided; the separator, negative electrode and positive electrode are individually cut into sheets of the desired size for a cell; tabs are added to the cut sheets of positive and negative electrodes; the cut sheets of positive and negative electrodes and separators are combined to form battery cells; battery cells may be wound or stacked to form the desired battery cell configuration; after the winding or stacking, the battery cells are placed in cans, the cans are evacuated, filled with electrolyte and then sealed.

Although embodiments of the present disclosure have been particularly described with reference to lithium ion batteries with graphitic negative electrodes, the teaching and principles of the present disclosure may be applicable to other lithium-based batteries such as Li-polymer, Li—S, Li—$FeS_2$, Li metal based batteries, etc. For the Li metal based batteries such as Li—S and Li—$FeS_2$ a thicker Li metal electrode may be needed and the thickness of Li metal depends on the positive electrode loading. In some embodiments the Li metal electrode may be between 3 and 30 microns thick for Li—S and roughly 190-200 microns for Li—$FeS_2$, and may be deposited on one or both sides of a compatible substrate such as a Cu or stainless steel metal foil—the methods and tools described herein may be used to fabricate such Li metal electrodes.

Furthermore, in some embodiments lithium metal based batteries may be fabricated by depositing a lithium metal negative electrode directly onto a battery separator structure followed by directly depositing the negative electrode current collector on to the surface of the lithium metal negative electrode—this forms a combined negative electrode and separator which can then be combined with a positive electrode, current collector, etc. to form a complete lithium metal based battery. The deposition of the lithium metal negative electrode can be as described above for the deposition of the thin film of lithium metal on the separator for a lithium ion battery, a difference being that the lithium metal negative electrode of a lithium metal based battery may in some embodiments be thicker, depending on the cathode material composition—for example, a lithium metal negative electrode may be 1 to 60 microns thick for lithium metal based batteries. The negative electrode current collector may be formed of a metal such as copper, nickel, stainless steel, metal alloys, etc., and may be deposited on to the lithium metal negative electrode by a process such as PVD, CVD, etc.; this fabrication method permits thin current collectors to be formed if desired—thinner than can be achieved if the current collector were to be a substrate. The separator in this embodiment for a lithium metal based battery may in embodiments comprise one or more of the various structures described above and shown in FIG. 2—for example, a ceramic coating, a barrier layer, and pores of a separator film filled with one or more materials chosen from the group consisting of a lithium ion-conducting polymer, a binder soluble in a liquid electrolyte, and a lithium ion-conducting ceramic material. The battery separator with lithium metal negative electrode and current collector may in some embodiments be fabricated using the tools and systems described above and shown in FIGS. 3-5, although the module 350 may be repurposed for deposition of the current collector by a PVD or CVD process.

Furthermore, in some embodiments a thin (sufficient to compensate for the irreversible loss of lithium metal during the first battery cycle) film of lithium (for example 1 to 5 micron thick film of lithium) may be deposited directly on the negative electrode using the methods and tools of the present disclosure—for example, a thin film of lithium metal may be deposited on a graphitic (with or without silicon) layer on a suitable electrically conductive substrate (for example copper, etc.).

Although embodiments of the present disclosure have been particularly described with reference to certain embodiments thereof, it should be readily apparent to those of ordinary skill in the art that changes and modifications in the form and details may be made without departing from the spirit and scope of the disclosure.

What is claimed is:

1. An apparatus for manufacturing lithium metal coated battery separators comprising:
    a reel to reel system for transporting a continuous separator film through one or more modules;
    a first module for depositing a film of lithium metal on said separator film, said first module being configured for depositing said film of lithium metal by a process chosen from the group consisting of physical vapor deposition, electron-beam evaporation, thin film transfer and slot die deposition and wherein said first module is further configured for depositing said film of lithium metal;
    a second module for depositing a ceramic layer on said separator film before depositing said film of lithium metal, wherein said film of lithium metal is deposited on a surface of said ceramic layer; and
    a third module for depositing one or more of a lithium ion-conducting polymer, a binder soluble in a liquid electrolyte, and a lithium ion-conducting ceramic material into said pores of said separator film for avoidance of depositing lithium metal into said pores of said separator film during a lithium metal deposition process, wherein lithium metal of said film of lithium metal does not fill said pores of said separator film during the lithium metal deposition process.

2. The apparatus as in claim 1, further comprising a fourth module for depositing a barrier layer on said ceramic layer before said film of lithium metal is deposited on said surface of said ceramic layer.

3. The apparatus as in claim 2, further comprising a fifth module for forming a protective coating on the surface of said film of lithium metal.

4. The apparatus as in claim 3, further comprising a sixth module for forming a current collector on the surface of said film of lithium metal.

5. A method for manufacturing lithium metal coated battery separators comprising:
    transporting a continuous separator film through a set of modules of a reel to reel system;
    depositing, at a first module, a film of lithium metal on the separator film, the first module being configured for depositing the film of lithium metal by a process chosen from the group consisting of physical vapor deposition, electron-beam evaporation, thin film transfer and slot die deposition and wherein the first module is further configured for depositing the film of lithium metal;
    depositing, at a second module, a ceramic layer on the separator film before depositing the film of lithium metal, wherein the film of lithium metal is deposited on a surface of the ceramic layer; and
    depositing, at a third module, one or more of a lithium ion-conducting polymer, a binder soluble in a liquid electrolyte, and a lithium ion-conducting ceramic material into the pores of the separator film for avoidance of depositing lithium metal into the pores of the separator film during a lithium metal deposition process.

6. The method of claim 5 wherein lithium metal of the film of lithium metal does not fill the pores of the separator film during the lithium metal deposition process.

7. The method of claim 5 further comprising depositing, at a fourth module, a barrier layer on the ceramic layer before the film of lithium metal is deposited on the surface of the ceramic layer.

8. The method of claim 7 further comprising forming, a fifth module, a protective coating on the surface of the film of lithium metal.

9. The method of claim 8 further comprising forming, at a sixth module, a current collector on the surface of the film of lithium metal.

10. The method of claim 5 wherein depositing the ceramic layer on the separator film comprises a layer by layer coating of oppositely charged particles from an aqueous medium, including:
    coating the separator film with a first layer of ceramic particles of a first polarity; and
    applying a second layer of ceramic particles to the first layer of ceramic particles, the second layer of ceramic particles charged to a second polarity opposite the first polarity.

11. The apparatus of claim 1 wherein the ceramic layer deposited on the separator film comprises a layer by layer coating of oppositely charged particles from an aqueous medium, including:
    a first layer of ceramic particles of a first polarity coated on the separator film; and
    a second layer of ceramic particles applied to the first layer of ceramic particles, the second layer of ceramic particles charged to a second polarity opposite the first polarity.

* * * * *